350-3.66 SR

XR 3,665,097

United States Patent

Macovski

[15] 3,665,097

[45] May 23, 1972

[54] OPTICAL DATA PROCESSING SYSTEM

[72] Inventor: Albert Macovski, Palo Alto, Calif.

[73] Assignee: Stanford Research Institute, Menlo Park, Calif.

[22] Filed: July 25, 1969

[21] Appl. No.: 844,807

[52] U.S. Cl. .......... 178/6, 350/3.5

[51] Int. Cl. .......... H04n 5/30

[58] Field of Search .......... 350/3.5; 178/6.5, 6; 340/5 H

[56] References Cited

UNITED STATES PATENTS 3,573,362 4/1971 Burchardt .......... 350/3.5

OTHER PUBLICATIONS

Gabor et al., Optical Image Synthesis by Aollographic Fourier Transformation, Physics Letter, Aug. 1965 Vol. 18 No. 2, pp. 116–118

Jackson, Analysis of Variable–Density Seismograms by means of Optical Diffraction, Geophysics, Vol. 30 No. 1 Feb. 1965, pp. 17, 18

Deschamps, Some Remarks on Radio Frequency Hologram, Proc. of IEEE Apr. 1967, pp. 570–571

*Primary Examiner*—Robert L. Griffin
*Assistant Examiner*—Joseph A. Orsino, Jr.
*Attorney*—Urban H. Faubion

[57] ABSTRACT

An optical data processing system compares the content of transparencies (as, for example, in correlating, convolving, and matched filtering) by combining the light transmitted by a first transparency with light transmitted by a second transparency and cyclically offsetting in time the relative phase between the light beams with a modulator. The resultant interference pattern contains light information which includes cross-correlation and auto-correlation terms with the desired cross-correlation terms placed on a temporal frequency carrier so that they are electrically separable. The interference pattern is temporally scanned in a plane essentially perpendicular to its axis (as by an image dissector) to generate a complex electrical waveform having frequencies containing information relative to both cross-correlation terms and auto-correlation terms. Since the cross-correlation terms are on a temporal frequency carrier, they are separated by a filter. A transparency may also be simultaneously compared to a plurality of other transparencies by cyclically temporally offsetting each of the reference light beams a different amount with a plurality of modulators. The desired cross-correlation terms with respect to each transparency are placed on a plurality of temporal frequency carriers which enables separation of desired terms from each other and from the undesired terms by filtering. In either case, the desired cross-correlation output from a filter may be utilized by a computer to provide the desired cross-correlation information. Alternatively, the desired cross-correlation information may be applied to cathode ray tube reproducers to form transparencies containing the desired information, and the transparencies thus formed utilized in a Fourier transform reconstruction apparatus to provide a visual display.

12 Claims, 13 Drawing Figures

3665097
NO OR CLASSIF

ALBERT MACOVSKI
INVENTOR.

BY Urban H. Faubion

ATTORNEY

ALBERT MACOVSKI
INVENTOR.

BY [signature]

ATTORNEY

Patented May 23, 1972 3,665,097

6 Sheets-Sheet 3

ALBERT MACOVSKI
INVENTOR.

BY [signature]

ATTORNEY

ALBERT MACOVSKI
INVENTOR.
BY [signature]
ATTORNEY

Patented May 23, 1972 3,665,097

6 Sheets-Sheet 5

ALBERT MACOVSKI
INVENTOR

BY Urban H. Faubion

ATTORNEY

ALBERT MACOVSKI
INVENTOR.

BY [signature]

ATTORNEY

OPTICAL DATA PROCESSING SYSTEM

CROSS REFERENCES TO RELATED APPLICATIONS

This application is related to applicant's copending application, Ser. No. 781,842, filed Dec. 6, 1968, entitled, "Scanned Holography Systems Using Temporal Modulation."

BACKGROUND OF THE INVENTION

1. Field of the Invention

This invention relates to optical data processing systems and more particularly to an optical data processing system using temporal modulation techniques whereby the required spatial frequencies in the output recording plane are minimized, and at the same time providing that the spatial frequencies of the various light information components are separable.

2. Description of the Prior Art

An optical data processing system in its simplest form may utilize only the image-casting properties of lenses. Such a system, for example, is described in U.S. Pat. No. 1,838,389, granted Dec. 29, 1931. In this data processing system, a transparency with intensity transmittance $t_1$ is imaged onto a second transparency with transmittance $t_2$. At each point behind the second transparency the intensity is proportional to the product $t_1 t_2$. A photo-detector can be used to measure the total intensity transmitted through the pair of transparencies and thus give an indication of the correspondence between the two transparencies.

More complicated data processing operations such as convolutions, cross-correlations, and matched filtering can also be simply accomplished using optical techniques. Such data processing operations depend upon the ability of coherent optical systems to provide two-dimensional Fourier transforms of vectors. In general, the techniques involve taking the product of the Fourier transforms of two functions, and then taking the inverse Fourier transform of that product.

One prior art optical data processing technique based on the Fourier transformability of lenses is that developed by A. B. VanderLugt discussed in "Signal Detection by Complex Spatial Filtering," Radar Lab Report No. 4594–22–T, Institute of Science and Technology, The University of Michigan, Ann Arbor (1963). In this technique the complex Fourier transform of a two-dimensional function is stored on film by adding an angularly offset reference beam. This has the effect of placing the transform, and its complex conjugate, on a spatial frequency carrier where the complex nature is preserved. That is, the interferometric process allows the recording of a complex function on an intensity sensitive detector by recording the amplitude and phase information as amplitude and phase modulations of a high-frequency carrier that is introduced by the angularly offset reference beam. To accomplish spatial filtering or cross-correlations with another two-dimensional function, the transform of the other two-dimensional function is shown through a film or filter with an additional lens used to take the inverse transform. The off-axis components of the inverse transform represent the various filtering operations. The Vander Lugt method, however, has the undesirable characteristic that a high degree of alignment accuracy must be used in taking the product of the transform of one function with the stored transform of another. For a more complete description and illustration of the Vander Lugt technique and its limitations, see *Introduction to Fourier Optics*, by Joseph W. Goodman, McGraw-Hill, 1968, pages 171–177.

Another prior art technique for optical data processing which avoids the alignment difficulties of the Vander Lugt method was developed by C. S. Weaver and H. W. Goodman, and is discussed in "A Technique for Optically Convolving Two Functions," *Applied Optics*, Vol. 5, No. 7, pages 1248–1249 (July, 1966). In this method, the product of the transforms of two transparencies is achieved directly by placing them in the same plane but separated from each other. Each of the transparencies is displaced an opposite distance $A$ in the $y$ direction. A lens situated a distance $f$ from the plane of the transparencies images them on a transform plane situated a distance $f$ from the lens. Each image is offset in the $y$ direction an amount $A$ so that the field amplitude at the transparency or transform plane are given by $$U = g^{(x,y-A)} + f^{(x,y+A)}$$

A transparency is formed whose amplitude transmission is equal (ignoring proportionally constants) to the intensity formed by the sum of the Fourier transforms as given by $$t = GG^* + FF^* + GF^* e^{-j} \frac{4\pi Ay}{\lambda f} + FG^* e^{j} \frac{4\pi Ay}{\lambda f}$$

where * represents conjugate

Using an additional lens to take the Fourier transform of this function, we obtain the output amplitudes as $U_{out} = g^* g \pm f^* f \pm (f^* g)^* [\Delta(x)\Delta(y-2A] + (g^* f)^* [\Delta(x)\Delta(y+2A)]$ where * represents cross-correlation, and * represents convolution.

The output is the sum of the auto-correlations occurring as an undiffracted image in the center, with the two diffracted cross-correlations occurring at $2A$ from the origin. Thus the desired products are placed on a spatial frequency carrier of frequency $2A/\Lambda f$ to avoid the auto-correlation terms which are essentially the interference between points within each $f$ and $g$ function. The spatial frequency offset required corresponds to the image offset $A$, and can be determined as follows. Since the $y$ extent of each image is $Y$, the maximum $f_y$ in each term is $Y/\Lambda f$ which is due to points at opposite ends of each transparency interfering. Thus the minimum value of separation $A$ is the size of the transparencies $Y$, and the spatial frequency requirements in the $y$ direction are three times that of the desired terms. For functions of equal extent in each dimension, such as alphanumerics, this requirement for separation means that a system with a given spatial bandwidth is restricted to one-ninth the number of elements in each function which it could otherwise resolve if spatial separation were not necessary. In addition, if a large number of functions are to be simultaneously cross-correlated with an unknown, as would be done in character recognition, additional spatial frequency response is needed for each additional function since it must be spatially offset.

SUMMARY OF THE INVENTION

Accordingly, it is the object of this invention to provide an optical data processing system wherein optical information may be separated from undesired optical information without any increase in spatial frequency response.

It is another object of this invention to provide an optical data processing system wherein the spatial frequency response necessary is limited to reproduction of only the desired information whereby the optical information is available for real-time reproduction in systems such as television.

It is another object of this invention to provide an optical data processing system capable of correlating an array of functions with no increase in spatial frequency response over that necessary for correlating two functions.

In carrying out the present invention in one form, an interference pattern is set up between a first light beam transmitted by an object transparency and one or more additional light beams transmitted by one or more additional transparencies. Desired information terms contained in the interference pattern are offset on temporal frequency carriers by cyclically temporally offsetting the relationship between the first light beam and each additional light beam. The interference pattern is temporally scanned in order to generate electrical frequencies representing the light information. The desired information terms are on temporal frequency carriers and are separated from each other and from undesired terms by filters. The desired light information from the filters is passed, recorded, and/or reconstructed.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings in which:

Figure 1:
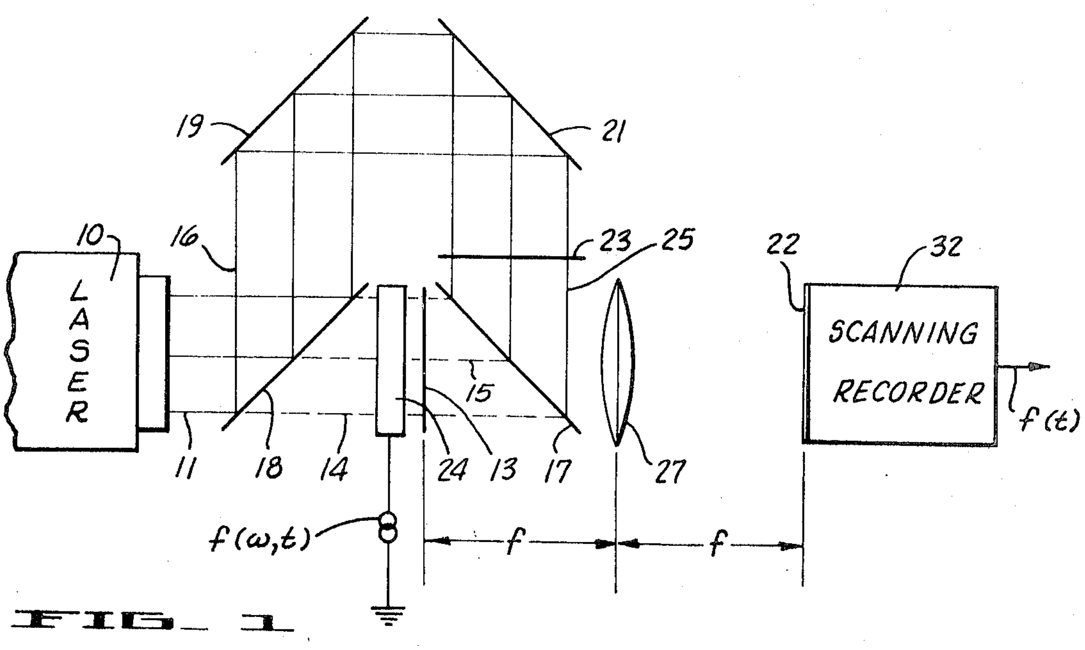
FIG. 1 is a schematic illustration showing an optical data correlator which uses temporal modulation according to the present invention.
Figure 3:
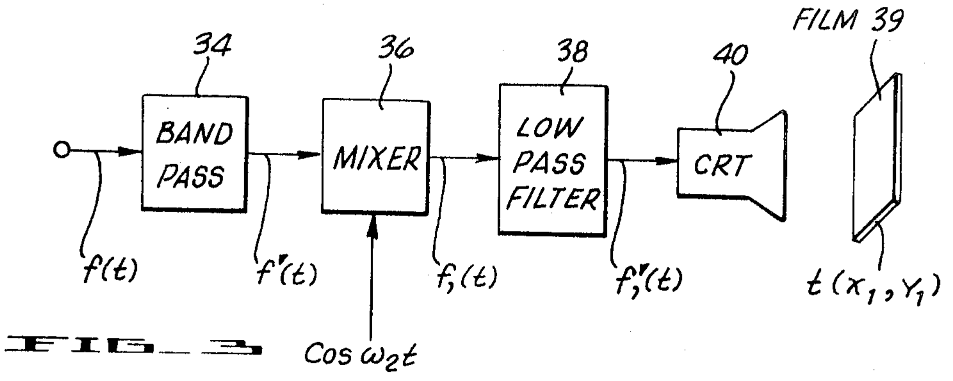
FIG. 3 is a diagrammatic illustration of an electrical system for converting the output of the image dissector of FIG. 1 to a visual display.
Figure 7:
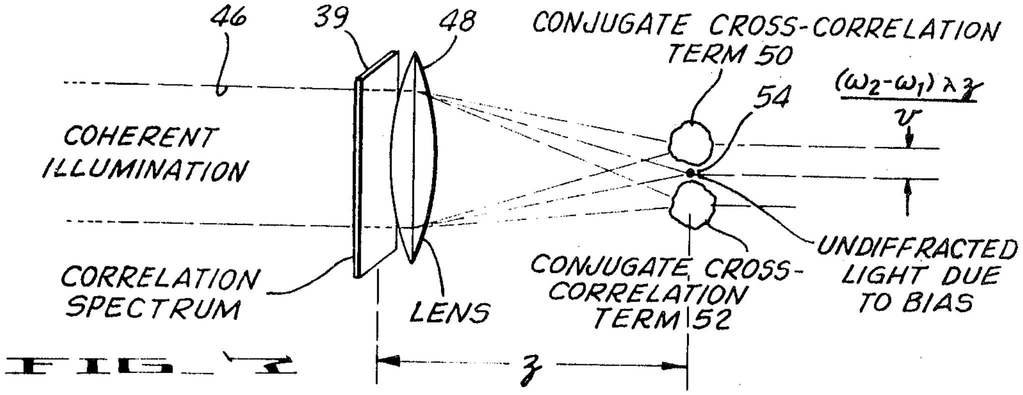
Figure 8:
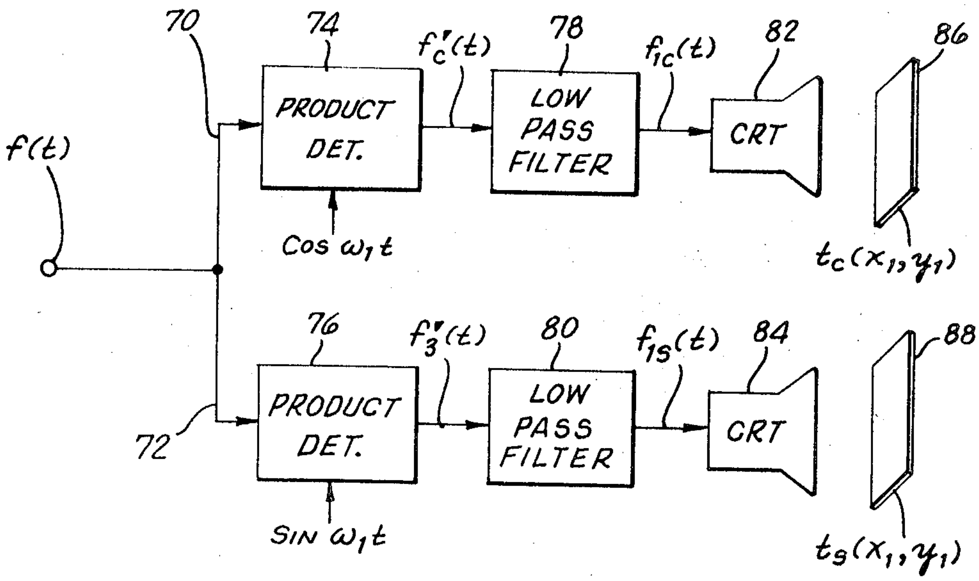
Figure 4:
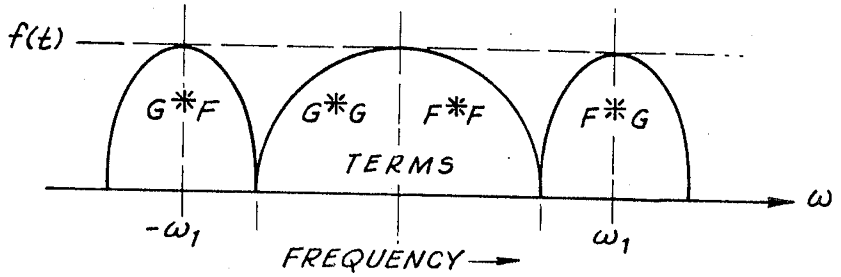
Figure 5:
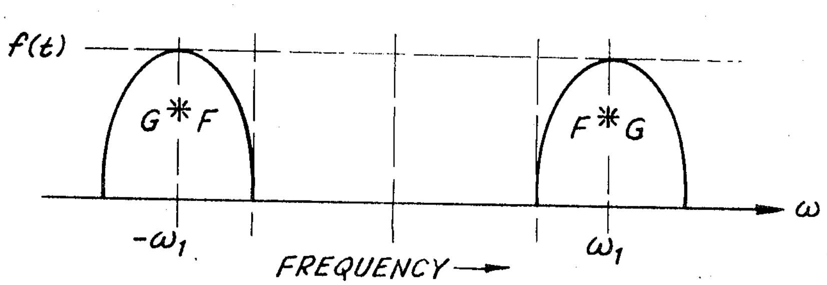
Figure 6:
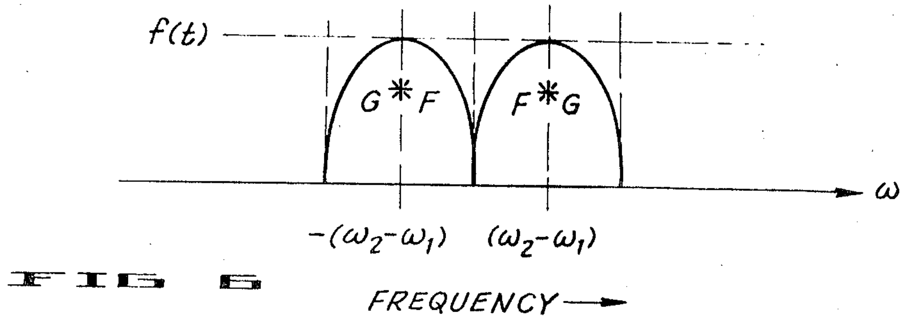
Figure 9:
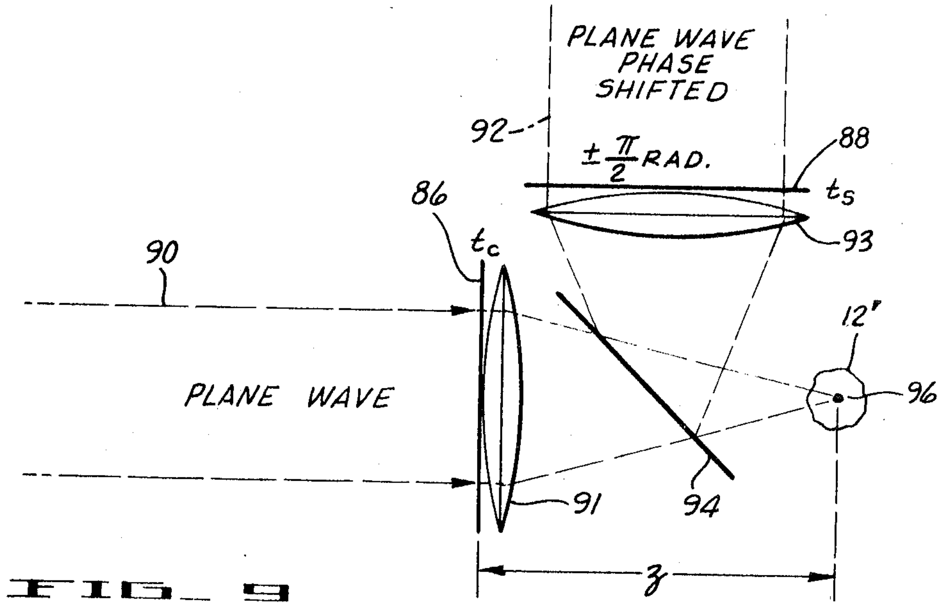
Figure 10:
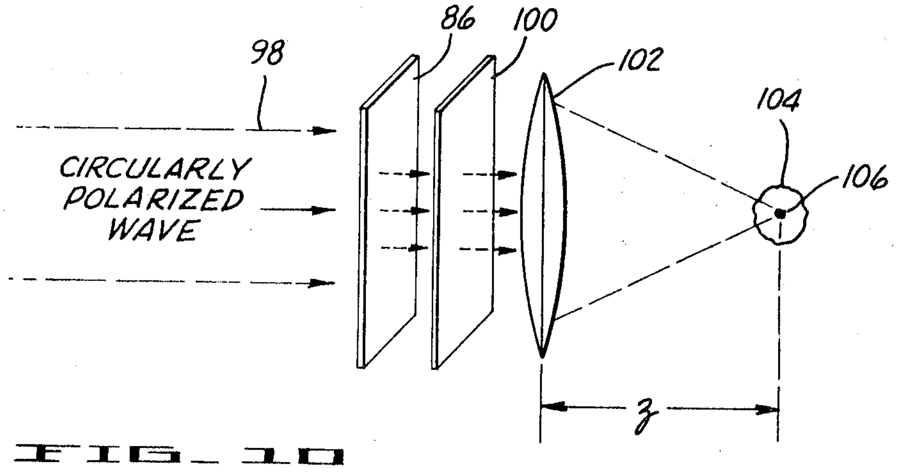
Figure 11:
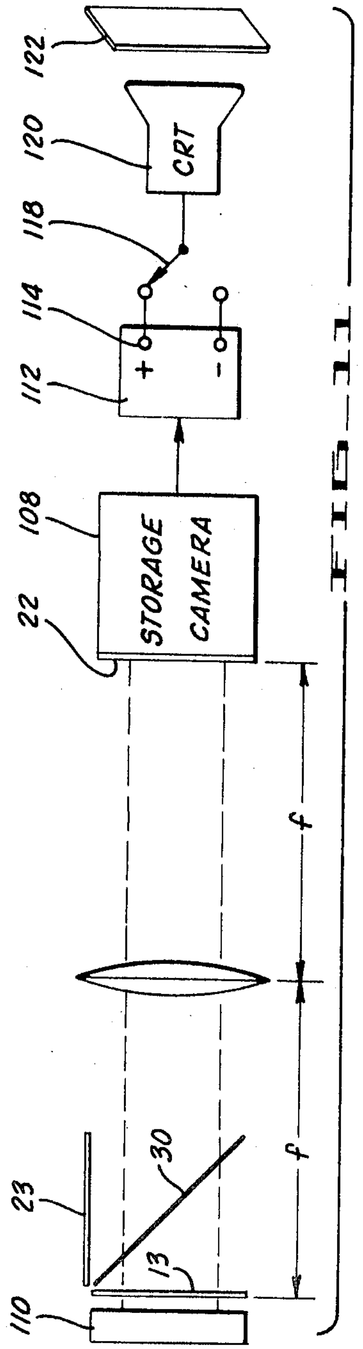
Figure 12:
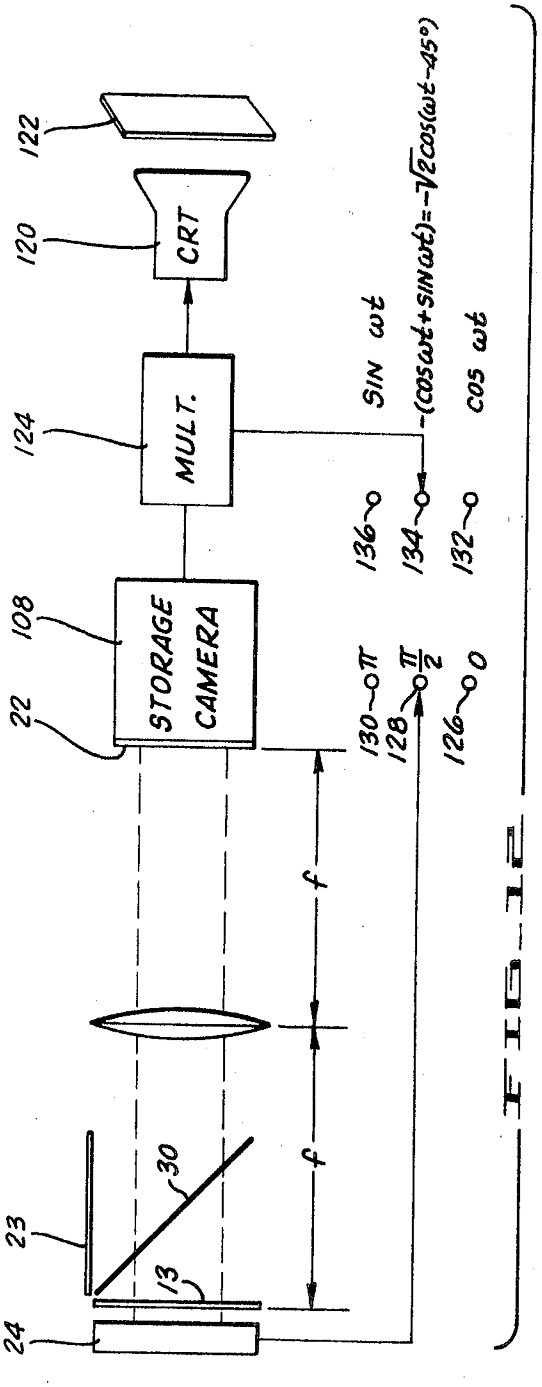
Figure 13:
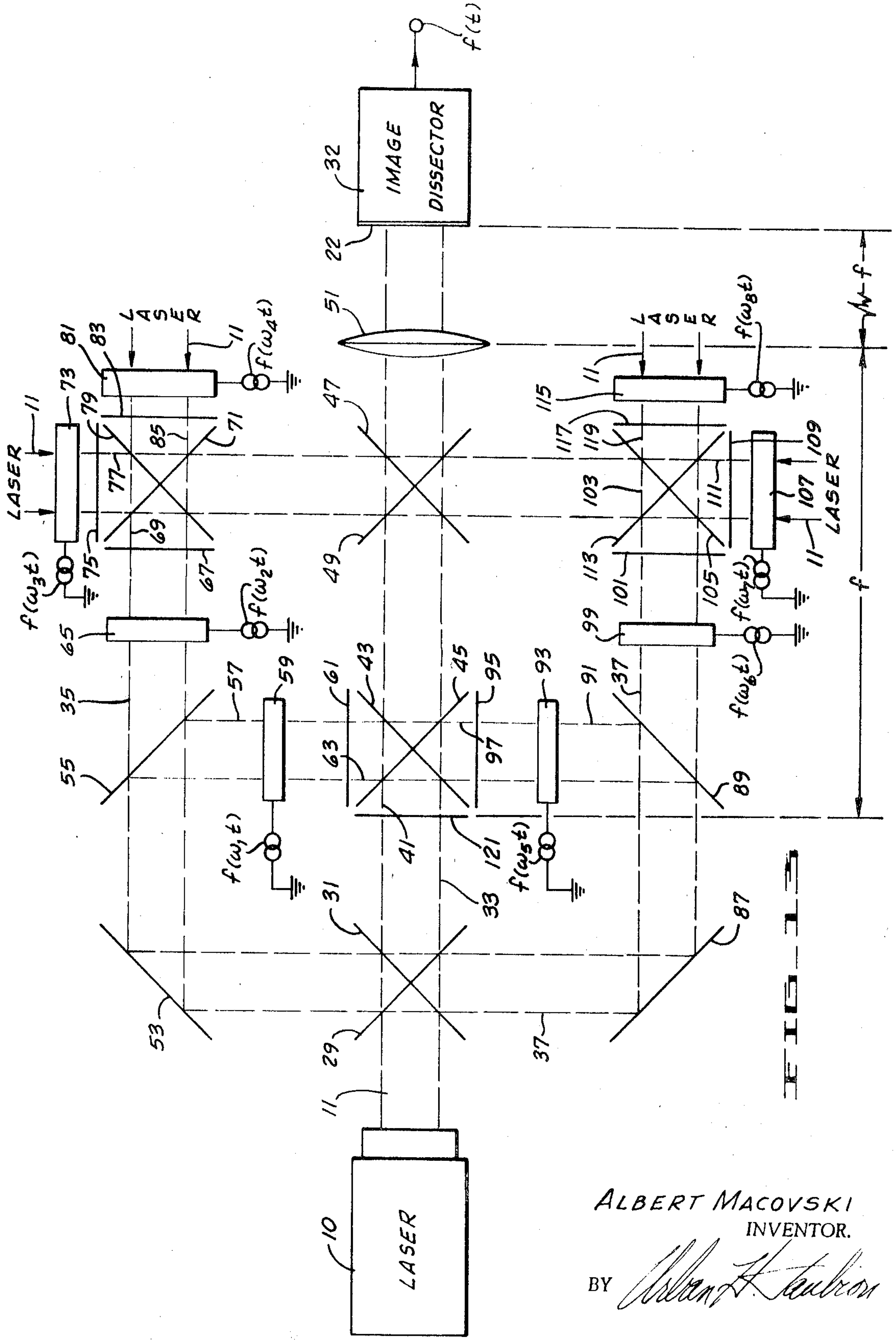

FIGS. 4, 5, and 6 are electrical frequency domain plots with frequency plotted on the axis of abscissa and intensity plotted along the axis of ordinates and showing the frequency bands wherein the light information components, separated at the various stages of the electrical system of FIG. 3, appear;

FIG. 7 is a schematic illustration showing a system for transforming the products of the image spectra produced by the data processing system of FIGS. 1 and 3 to produce the conjugate cross-correlations;

FIG. 8 illustrates diagrammatically another data processing system using temporal modulation according to the principles of the present invention and providing two transparencies which must be superimpose in order to reconstruct an image;

FIG. 9 is a schematic diagram showing a method of reconstructing an image from the transparencies generated by the system of FIG. 8;

FIG. 10 illustrates a means of reconstructing an image made from a pair of 90° polarized encodings on Vectograph film as discussed relative to the system of FIG. 8;

FIGS. 11 and 12 illustrate diagrammatically visual reconstruction systems which utilize storage-type cameras to translate the intensity pattern at the interference plane into electrical waveforms; and FIG. 13 is a schematic illustration of a data processing system for correlating an unknown function with many known functions as might be required in pattern recognition.

DESCRIPTION OF THE PREFERRED EMBODIMENTS

A preferred embodiment of the invention is illustrated in FIG. 1. A single source of coherent light, a laser 10 generates both first and second transparency beams. The coherent beam 11 of laser 10 is divided into a first beam 14 and a second beam 16 by a half-silvered mirror 18 which is disposed in the path of the coherent laser beam 11 at a 45° angle relative to the beam axis. The half-silvered mirror 18 is known as a "-beam-splitter" inasmuch as approximately half of the light incident thereon is transmitted (here forming the first beam 14 and approximately half is reflected (constituting second beam 16).

Since the beam-splitter 18 is at a 45° angle relative to the incident beam 11, the first and second beams 14 and 16, respectively, are disposed at 90°. In order to provide a cyclical temporal offset between the first and second beams 14 and 16, a light frequency shifter 24 is inserted in the path of the first beam 14. In this case the frequency shifter 24 constitutes a single side-band modulator which shifts the frequency of first wave 14 by an amount $\omega_1$. The light from first wave 14 thus modulated is transmitted through a first transparency 13 to form a scattered first beam 15 incident on a beam-splitter 17.

The second beam 16 is reflected by mirrors 19 and 21 (each disposed at 45° relative to the light incident thereon) through a second transparency 23 to form a scattered second beam 25, also incident on beam-splitter 17. The beam-splitter 17 combines the scattered first beam 15 and the scattered second beam 25 and images them through a lens 27 into an interference pattern 22 on the face of a scanning recorder 32.

In order better to be able to understand how the desired image information is separated from undesired light terms, consider the information obtained by summing the first and second beams at a given plane such as the plane of interference pattern 22. The amplitude of the light scattered from the second transparency at the recorder plane is designated by $G$ and the amplitude of the light scattered by the first transparency at the recorder plane which is offset in frequency by an amount $\omega_1$ using the modulator 24 is $$Fe^{j\omega_1 t}$$

where $F$ represents the amplitude of the unmodulated wave. Thus, the sum of the two beams at the plane of interference pattern 22 is represented by $$I = [Fe^{j\omega_1 t} + G]^2 = GG^* + FF^* + GF^* e^{-j\omega_1 t} + FG^* e^{+j\omega_1 t}$$

The above equation shows that in the interference pattern neither the term which results from the various points of the first transparency interfering with each other ($FF^*$) nor the term which results from the various points in the second transparency interfering with each other ($GG^*$) is modulated, while the desired interference fringes due to the interference between points of the first transparency and points of the second transparency (transform of the cross correlation) are modulated or offset by an amount corresponding to the offset frequency $\omega_1$. Thus, the time domain allows separation of correlations terms from each other and from the various "noise" or auto correlation terms.

The type of phase modulator, frequency shifter, or variable time delay device 24 used in the illustrated embodiment is one of the class of electro-optic devices which consists of an electro-optic material having an index of refraction proportional to the voltage applied to the cell. Voltage is applied to the modulator 24 in the form of a saw-tooth wave which returns from its maximum of $2\pi$ radians to zero every $2\pi/\omega_1$ seconds. This results in the phase shift illustrated in FIG. 2 where time is plotted along the axis of abscissa and phase shift along the axis of ordinates. The voltage increases linearly from zero at zero time to a maximum at $2\pi/\omega_1$ seconds and the index of refraction of the electro-optic material increases as the voltage increases; thus effectively slowing down the reference light beam 18 as it passes through the electro-optic modulator 24 shifting the phase linearly to $2\pi$ radians. At time $2\pi/\omega_1$ the applied voltage is abruptly reduced to zero and the index of refraction of the electro-optic modulator 24 is reduced to a minimum, and the phase shift returns to zero. Thus, the reference light wave 14 is effectively slowed down and speeded up as it passes through the electro-optic cell 24, thus providing a phase modulation and a shifted frequency. For a more complete description of this action, see U.S. Pat. No. 3,353,896, Nov. 21, 1967, issued to D. J. Blattner and entitled "Light Frequency Shifter."

From the form of the intensity equation above, it will be recognized that the intensity pattern can be recorded on a scanning device which can respond to the offset frequency $\omega_1$. One pickup or scanning device which will do the job (referred to in FIG. 1 as the scanning recorder 32) is a mechanically scanned photocell or an electronically scanned image dissector. For purposes of the present description, assume that scanning recorder 32 is a conventional image dissector. The electrical waveform $f(t)$ generated by the image dissector 32 then has the light information relative to all of the interference pattern scanned. That is, the resultant signal or electrical waveform generated by the image dissector 32 is representative of the intensity equation expressed above and can be applied to a computer (not shown) to perform an inverse transform to obtain the desired correlation information between the first and second transparencies.

FIG. 3 is an illustration of an electrical system for manipulating $f(t)$ to obtain a visual representation of the desired correlation terms. The electrical circuit of FIG. 3 includes a bandpass filter 34, a mixer 36, a lowpass filter 38, a cathode ray tube 40, and a film 39. An understanding of the operation of the circuit of FIG. 3 may best be had by reference to FIG. 4 which illustrates the electrical frequency domain. In this figure, frequency is plotted along the axis of abscissa and intensity is plotted along the axis of ordinates. The undesired $GG^*$ and $FF^*$ terms occur in a midband of frequencies about the axis of ordinates, whereas the frequencies of the $G^*F$ term and the $F^*G$ term (cross correlation terms) occur in "side bands" spaced above and below the midband.

Since the interference pattern is varying cyclically in a manner determined by the frequency of modulation of the light modulator 24 in one beam path, the horizontal scan velocity $v$ of the image dissector 32 must be timed such that the relative phase of the wave form generated (and thus the relative phase of the intensity pattern "seen" by the scanning beam) is the same on each successive scan line. This is accomplished by making the horizontal scan frequency of the image dissector 32 on integral divisor of the frequency of modulation $\omega_1/2\pi$. Thus, the frequency of scan is locked to the offset frequency and, for a uniform object wave, each successive scan line generates the same pattern and consequently a uniform grating pattern in the direction of the horizontal scan.

The center frequency of the side-bands which contain the conjugate image information (side-bands containing $G^*F$ and $F^*G$ terms) are located above and below the central axis of ordinates in the plot of FIG. 4 by an amount $\omega_1$ which corresponds to a spatial frequency of $\omega_1/v$; in other words, by an amount determined by the offset frequency. Thus, in order to separate the conjugate image terms and reject the undesired terms, the scanned recorder 32 is followed by a bandpass filter 34 tuned about the frequency $\omega_1$. The resultant electrical waveform $f(t)$ is still a function of intensity and is of the form $$f(t) = F^*Ge^{-j\omega_1 t} + G^*F^{j\omega_1 t}$$

The plot of FIG. 5 which has the same ordinates and abscissae as does that of FIG. 4 illustrates how the output of the bandpass filter 34 includes the sidebands containing the desired conjugate image terms but eliminates entirely the undesired midband of frequencies. It is not essential that bandpass filter 34 be utilized here but it assures less interference in the system.

Since the conjugate cross-correlation terms are separated and the undesired terms are eliminated from the electrical waveform at this point, it would be feasible to reproduce the images on a display such as a cathode ray tube; however, this would be an inefficient use of he tube and require a relatively high resolution device since, as noted from the diagram of FIG. 4, the center frequency of the two conjugate cross-correlation terms are at $\pm\omega_1$, corresponding to a spatial frequency of $\omega_1/v$ when reproduced. Thus, to reproduce the cross-correlation information bands, it would require a high resolution display and the information would appear at widely separated locations.

In order to reduce the distance between the bands of information containing the conjugate cross-correlation and the associated resolution requirement, the bandpass filter 34 is followed by a mixer 36, which multiplies the information containing electrical waveform $f_1(t)$ by a function of cos $\omega_2 t$. This serves to heterodyne the cross-correlation containing sidebands down to the difference frequency $(\omega_2 - \omega_1)$. The difference frequency can be reduced to the point where the two correlation spectra, $$G^*Fe^{-j(\omega_1-\omega_2/v)x} \text{ and } F^*Ge^{j(\omega_2-\omega_1/v)x}$$

meet at the origin. The output of the mixer, $f_1(t)$, is illustrated in FIG. 6 which has the same ordinates and abscissae as FIGS. 4 and 5. Here the conjugate cross-correlation information bands meet at the origin, and thus are each centered at frequencies $\pm(\omega_2 - \omega_1)$, corresponding to a spatial frequency of $(\omega_2 - \omega_1/v)$ from the origin. A lowpass filter 38 may be inserted in the system after the mixer in order to eliminate the high frequency mixer products and make sure the waveform $f_1(t)$ contains as few unessential frequencies as possible.

In order to provide a visual display of the correlation information and a means of recording the information, lowpass filter 38 is followed by a display tube such as a cathode ray tube 40 and a film plate 39 or other recording media is provided to take a picture of the correlator spectrum displayed on the face of cathode ray tube. Only the desired conjugate image information is contained in the holographic image.

Since the sidebands containing the conjugate cross-correlation information have been reduced in frequency as far as possible without causing them to overlap, the spatial frequency requirements or required number of lines for the reproducing devices (cathode ray tube 40 and film plate 39 here) are twice that of the pickup camera in the horizontal ($x$) direction (because of the two correlation spectra being reproduced) and equal to that of the camera in the $y$ direction. Thus, the resolution requirements for these devices is minimized.

Most efficient use of recording devices are made in the system because spatial frequencies in the recording plane are minimized. That is, if the required spatial frequencies in the recording plane are minimized, lower resolution devices are required or if high-resolution recording devices are used, they are used to their best advantage.

FIG. 7 illustrates a system for reconstructing the conjugate cross-correlation information in the most conventional fashion. The film recording 39 is subjected to light 46 from a source of coherent illumination (not shown) having the same characteristics as the illumination utilized to crate the transparency 39. Light passing through the transparency 39 is diffracted by the recorded pattern and focused by a lens system 48 to reconstruct the conjugate cross-correlations 50 and 52. In the system illustrated the lens system 48 is chosen to have a focal length $z$ which produces conjugate cross-correlations 50 and 52 having a 1 to 1 relationship in size to the original transparencies 13 and 23 from which the recording was made. In this case, then, the distance $z$ from the plane of recording 39 to the cross-correlations 50 and 52 produced is substantially the same as the distance from the transparencies 13 and 23 to the plane of interference pattern 22.

The center of the reconstruction contains a point image 54 which represents undiffracted light due to bias. The reconstruction is not unlike the frequency domain pattern of FIG. 5. That is, in the frequency domain plot of FIG. 5, there are two sidebands containing conjugate cross-correlation terms above and below the axis of abscissae with the center frequency of those bands resulting in a spatial frequency of $\pm(\omega_2 - \omega_1/v)$, and in the reconstruction of FIG. 7 the conjugate cross-correlations 50 and 52 are reconstructed on opposite sides of the center 54 with their centers $(\omega_2 - \omega_1/v)\,z$ from the center 54 of the reconstruction where $\Lambda$ is the wavelength of the coherent illumination, $z$ is the focal length, $v$ is the scan velocity of the image dissector 32, $\omega_2$ is the heterodyning frequency and $\omega_1$ the original offset frequency introduced by phase modulator 24.

The focal length of the lens system 48 does not have to be equal to the distance between the transparencies 13 and 23 and the plane of interference pattern 22. If the focal length is made greater, the reconstructed cross-correlations will be further removed from the plane of the transparency 39 and if it is made less, the reconstructed cross-correlations will appear closer to the plane of the transparency 39. The cross-correlations will either be magnified or reduced in size, depending on the optics. Further, it is not essential that the illuminating wave 46 be the same as the original object illumination. Types of illumination which may be utilized for image reconstruction are treated elsewhere and are not considered part of the present invention.

Figure 2:
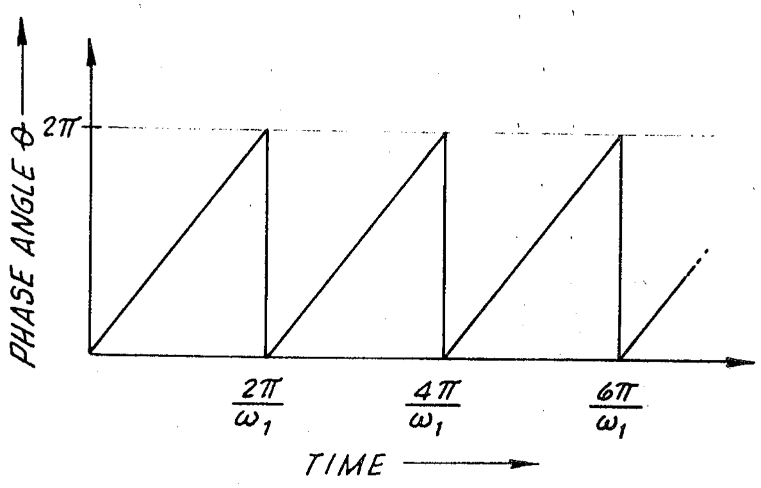
FIG. 2 illustrates a sawtooth waveform which represents the manner in which the plane reference wave is modulated to provide a temporal modulation; that is, time is plotted on the axis of abscissa, and the phase angle is plotted along the axis of ordinates and the illustration shows that the phase is modulated $2\pi$ radians and returned to its initial reference position cyclically.

In order to present practical values for the parameters involved, consider the system described in connection with FIG. 2 A HeNe laser having a wavelength $\Lambda$ of 632.8 nanometers provides the source of coherent light 10. The optics has already been described. The pickup device 32 used is an image dissector which has a resolution of approximately 300 lines in each dimension. It is operated at a horizontal line frequency of 1 7/8 cps or 1825 second per scan. The vertical scan time to produce 300 lines at this horizontal scan rate is 216 seconds. The required baseband video bandwidth to preserve 300-line resolution at the listed horizontal scan time is 208 cps.

As previously explained, the offset frequency $\omega_1$ provided by modulator 24) and mixer frequency $\omega_2$ (provided by mixer 36) must each be integral multiples of the line frequency $\omega_2$ so that the temporal offset will result in a spatial offset in the $x$ (horizontal) direction. To provide the offset frequency $\omega_1$ a 1,000 cps offset frequency triggers a sawtooth generator (not shown) which drives a light modulator consisting of a $KD^*P$ (potassium di-deuteurium phosphate) crystal. The axial electric field controls the difference in index between the crystal vertical and horizontal polarizations. In this application, however, the linearly polarized light is lined up with either the vertical or horizontal axis so that the device acts as a phase modulator with one of the indices being linearly changed by the applied voltage. These devices are relatively insensitive so that a saw-tooth of 7,200 volts peak to peak is required to provide the necessary $2\pi$ radians of phase shift.

The desired cross-correlation information appears within 208 cycles on either side of the 1,000-cycle offset frequency since the baseband video bandwidth is 208 cycles. This 792–1208 cps offset signal is applied to a bandpass filter 34 consisting of a double-tuned circuit. It is then mixed with the 1,225 cps mixer reference 36 and applied to the lowpass filter 38 to reduce the offset frequency to 225 cycles. Thus the output signal has a bandwidth of 17–433 cps. To completely reproduce this signal at the line frequency of 25/18 cps requires a horizontal resolution of 623 elements. A cathode ray tube 40 capable of providing the required output resolution is used.

The system is symmetrical in he sense that, as long as the two waves are modulated one with respect to the other, it is not significant which of the waves is temporally offset. In fact, if the offset is properly phased, it is advantageous in some instances to modulate both the waves. Since modulation of the first wave relative to the second wave may be accomplished simply by moving the modulator 24 (referring to FIG. 1) into the path of the first wave, e.g., such as in the path of first wave 16 between the beamsplitter 18 which forms the second wave from the incident light of laser 10 and the first transparency 23, it is believed that a separate illustration to show this arrangement is unnecessary.

Various other means of producing a visual correlation indication from the interference pattern 22 are possible. One such other means is illustrated in FIG. 8. In FIG. 8 $f(t)$ is the signal produced by the image dissector 32 as described before in connection with FIG. 1. The intensity equation $f(t)$ may be written in the form $$f(t)=G^*G+F^*F+(F^*G+G^*F)\cos\omega_1 t+j(F^*G-G^*F)\sin\omega_1 t$$

Utilizing the frequency components expressed in the above equation and providing the proper operators, two transparencies may be generated which completely define the images. That is, two transparencies may be made having information representing the real and imaginary parts, respectively, of the cross-correlation terms. This being so, both the pickup camera and reproducer resolution requirements can be reduced to that of the cross-correlation terms themselves.

In order to reduce the reproducer resolution requirements, two reproducing channels 70 and 72 are provided. The intensity wave form coming from the scanning recorder 32 is multiplied in one channel 70 by cos $\omega_1$t and in the other, 72 by sin $\omega_1$t in separate product detectors 74 and 76, respectively, so that the real and imaginery parts of the cross-correlation terms $(G^*F+F^*G)$ and j$(G^*F-F^*G)$ will be separately produced in the two channels. The $G^*G$ and $F^*F$ terms may be removed by a bandpass filter preceding the product detectors 72 and 74, or filtering may be left to lowpass filters 78 and 80 which follow product detectors 74 and 76 in the channels 70 and 72, respectively. Each of the lowpass filters 78 and 80 cut off at the product of the highest spatial frequency in the horizontal dimension of the cross-correlation terms $f(x)$ and the image dissector scan velocity $v$. This results in eliminating the undesired $F^*F+G^*G$ terms and the second harmonic terms from the product. The terms remaining after filtering the waveforms $f_c(t)$ in cosine channel 70 and $f_s(t)$ in sine channel 72 constitute the real and imaginary parts $$f_{1_c}(t) \text{ and } f_{1_s}(t).$$

These terms have the following form $$f_{1_c}(t)=(F^*G+G^*F)$$

$$f_{1_s}(t)=j(F^*G-G^*F)$$

Each of these waveforms (time functions) is applied, along with bias, terms to the reproducer (cathode ray tubes 82 and 84) in its respective channel. The images produced on the face of cathode ray tubes 82 and 84 respectively are recorded on film plates 86 and 88, respectively. The two transparencies 86 and 88 contain information representing the real and imaginary terms, $t_c$ and $t_s$ respectively. These terms are expressed as $t_c(x,y)=b_c+(F^*G+G^*F)$ and $t_s(s,y)=b_s+j(F^*G-G^*F)$ In order to produce a single correlation from the information recorded on the two film plates 86 and 88 made from the two-channel system of FIG. 8, the transparencies 86 and 88 are optically superimposed using plane waves 90° apart. The method of reproduction is illustrated in FIG. 9. A coherent plane wave is directed (along a horizontal axis as illustrated) through the film plate 86 which has real terms stored thereon, and a lens system 91 having a focal length $z$ is provided to focus the light diffracted by the film plate 86. Concurrently a coherent lane wave 92 (downward in the figure) which has its phase shifted 90° relative to the coherent plane wave 90 is directed through film plate 88. Another lens system 93, also having a focal length $z$, is provided to focus the light thus diffracted from imaginary term containing transparency 88 on a half-silvered mirror 94 disposed at an angle of 45° in the path of the light diffracted from the real film plate 86. Thus, the light directed on the mirror 94 from the lens system 93 is directly superimposed on the light from the real term. A reconstructed cross-correlation between first and second transparencies 23 and 13 is formed a distance $z$ from the center of both lens systems as measured along the axis of the diffracted light beams. Due to bias terms ($b_c$ and $b_s$ in above equations) a spot appears in the center of the reconstructed cross-correlation.

The primary difficulty with this system is that exceedingly accurate registration of images from the two film plates is required nd accurate phase shift of the two waves is required. A significant method of minimizing both the registration and phasing problems of the reconstruction system described and illustrated relative to the systems of FIGS. 9 and 10 involves utilizing only a single channel of the recording system illustrated in FIG. 8 and a unique recording film called "vectograph" film. This film consists of polarizing filters which allows separate recording of vertically and horizontally polarized components of a light wave.

Consider making the recording with only the upper channel 20 of FIG. 8 wherein the product detector 74 operating on the electrical waveform $f(t)$ multiplies by the function cos $\omega_1 t$. A linear polarizer (not shown) is inserted between the face of the cathode ray tube 82 and the vectograph film plate 86, or, the polarizer may be inserted at any point in the interfering light paths. With the polarizer in the light path oriented so that its polarization is vertical, the real components $t_c(x_1,y_1)$ of the light waves are recorded on the vectograph film. Next, the imaginary components $t_s(x_1, y_1)$ are recorded applying the function sin $\omega_1 t$ to product detector 74 and with the linear polarizer rotated 90° to its horizontal position. Thus, two registered and separately addressable transparencies are stored on a single substrate.

In order to reconstruct the cross-correlation, the vectograph encoded film 86 is illuminated by a right or left circularly polarized plane wave 98, that is, a plane wave with vertical and horizontal components 90° apart. Since the vectograph film consists of polarizing filters, a vertically polarized plane wave is emitted which is modulated by the real part of the recorded transparency and horizontally polarized wave is emitted which is in time quadrature with the vertically polarized wave and which is modulated by the imaginary part of the recorded transparency. Waves of different polarization (horizontal and vertical) do not interfere. Therefore, real and imaginary components emitted by the vectograph film will not combine to form the desired cross-correlation. As a consequence, it is necessary to insert a linear polarizer 100 oriented at 45° in the emitted light path. With this orientation, light transmitted through the linear polarizer effectively combines equal components from the vertically and horizontally polarized portions of the incident light and thus combines equal components from the real and imaginary transparencies $t_c$ and $t_s$, respectively.

A lens system 102 having a focal length $z$ which is equal to the distance between the first and second transparencies 23 and 13 and the plane of interference pattern 22 is positioned in the light path to focus light passing through linear polarizer 100. A reconstruction 104 of the cross-correlation spectrum between the transparencies 13 and 23 appears a focal length away from the lens 102 and again, it will have a bright spot in he center due to bias terms. Thus a single-transparency is used to produce a reconstruction with all of the components involved.

In the systems discussed thus far, high-frequency signals are generated that must be resolved by devices which respond to the instantaneous time varying intensity of the interference pattern. As previously indicated, devices which can accomplish this include mechanically scanned photocells and image dissectors. These devices, however, have low light efficiency since they collect photons from a particular picture element only while the element is scanned. As a consequence, either high light levels or slow scanning rates may be required. Storage-type television cameras such as vidicons and image orthicons integrate the light for an entire frame interval and then destructively read out the stored value for each element. Thus, the number of photons per element, for a given frame time, is increased by $n$ where $n$ is the total number of picture elements. These storage cameras have high light efficiencies. Although they cannot respond to high-frequency light variations, they can be efficiently used in optical data processing if additional storage devices are used algebraically to combine a number of frames.

One embodiment using a vidicon or an orthicon is illustrated in FIG. 11. This arrangement is similar in many respects to one of the channels of the embodiment of FIG. utilizing the recording arrangement of the embodiment of FIG. 1. That is, light scattered from a coherently illuminated first transparency 23 (light source not shown) is directed through the back of a half-silvered mirror 30 onto the face of a vidicon or orthicon tube 108 and a light scattered from a coherently illuminated second transparency 13 is directed onto the front face of the half-silvered mirror 30 so that it is also incident upon the front face of the vidicon. In this case a switchable phase shifter 110, which may be of the electro-optical kind described with respect to the embodiment of FIG. 1 is placed in the second light beam immediately before the second transparency 13. Thus, the interference pattern to be recorded appears on a plane at the face of the vidicon tube 108. The output of the vidicon 108 is connected directly to what may be termed a phase splitter 112 which has positive and negative terminals 114 and 116, respectively, and a switchable contact arm 118 which may selectively be moved between positive and negative terminals 114 and 116. The phase splitter is connected by means of its switchable arm 118 to he cathode ray tube 120 which generates a picture on its face corresponding to the electrical wave form received from the phase splitter 112. A recording is made on a film plate 122 which is shown adjacent to the face of the cathode ray tube 120.

When the arm 118 of phase splitter 112 is connected to the positive terminal 114, the phase splitter is applied to the cathode ray tube 120 with a positive amplitude. This voltage amplitude so applied is a direct function of the intensity of the interference pattern on the face of the vidicon tube. When contact arm 118 of phase splitter 112 is on the negative terminal 116, the amplitude of the waveform from the vidicon 108 applied to the cathode ray tube 120 is again a direct function of the interference pattern scanned but inverted.

In order to produce a recording from which a visual cross-correlation may be reconstructed, the hologram intensity on the vidicon is scanned once with the phase splitter connector arm 118 in the positive position 114, thus providing an intensity pattern $I_1(x_1,y_1)$ on the cathode ray tube face. Next, a voltage is applied to the switchable phase shifter 110 providing a phase shift (angle $\alpha$) in the second beam path and the switch arm 118 on the phase splitter 112 is moved to the negative or reversed position 116. A second intensity pattern is generated on the face of the cathode ray tube 120 (hence on the film plate 122) represented by $I_2(x_1,y_1)$. Assuming that the amplitude transmittance of the film is equal to the resultant input intensity, the result of the amplitude transmission is given by $t = (I_1 + I_2)$ which expanded becomes:

$$t = F^*F + G^*G + G^*F + F^*G - [F^*F + G^*G + G^*Fe^{j\alpha} + F^*Ge^{-j\alpha}] = G^*F(I - e^{j\alpha}) + F^*G(I - e^{-j\alpha})$$

Thus, the desired cross-correlation terms are separated from the undesired autocorrelation terms, although not from each other. In order to separate the cross-correlation terms, it is necessary to create another transparency as provided by the two-channel system of FIG. 8 and a reconstruction utilizing the optical reconstruction system using two transparencies as illustrated and described with respect to FIG. 9, or the single transparency "Vectograph" system of FIG. 10.

In order to understand how the two transparencies are made consider the phase shift as $\pi/2$ radians for the second intensity pattern $I_2$. That is, the first transparency $t_1$ is produced from $(I_1 - I_2)$ using the phase shift $\pi/2$ radians for $I_2$. A second transparency $t_2$ is produced first using a phase shift of $\pi/2$ with the phase splitter switch arm 118 in the positive position. That is to say, the first intensity pattern for the second transparency is generated leaving the phase shifter voltage as it was to take the initial intensity pattern $I_2$ and moving the phase splitter arm to its positive position 114. Thus, this intensity pattern may be considered a positive $I_2$.

Next the phase splitter switch arm 118 is moved to the negative position 116, the voltage of the phase shifter is adjusted so that there is a phase shift of $\pi$ radians from the initial position or $\pi/2$ radians from the condition when the intensity pattern $I_2$ was taken. The new intensity pattern $I_3$ is recorded on the film plate 122. Thus, a second transparency $T_2 = (I_2 - I_3)$ is produced.

When these two transparencies, i.e., $t_1$ and $t_2$ are combined in spatial quadrature as shown and described with respect to FIG. 10, an image is produced as indicated by the following equation $$t_1 + jt_2 + (I_1 - I_2) + j(I_2 - I_3) = 2(l+j)F^*G$$

The desired image term is thus isolated and a single image is reconstructed. If the other conjugate image $(G^*F)$ is desired, the transparencies are combined as $t_1 - jt_2$. Again, as described relative to cross-correlation reconstruction using two transparencies described in connection with FIG. 9.

Thus 3 scanned frames, taken with different static phase shifts and subtracted from each other in storage devices, can be used to isolate the desired cross-correlation terms with no spatial offset of the reference required. Like the two-channel system described relative to FIG. 8, however, the method just described has the disadvantage of requiring two transparencies (or a single vectograph film as described relative to the reconstruction shown in FIG. 10 and having a bright point within the reconstructed cross-correlation due to the bias terms in the transparencies.

The recording can be placed on a single transparency with the reconstructed conjugate cross-correlation just spatially offset from each other as shown and described relative to the reconstruction system illustrated in FIG. 7. This is done by modulating the $(I_1 - I_2)$ waveform with cos $\omega t$ and the $(I_2 - I_3)$ waveform with sin $\omega t$.

$$f_1(t) = (I_1 - I_2)\cos\omega t - (I_2 - I_3)\sin\omega t$$

which expanded is $$f_1(t) = I_1\cos\omega t - I_2(\cos\omega t + \sin\omega t) + I_3(\sin\omega t$$

One way to generate the proper output waveform directly as written in the first of the two equations above is, for example, to record the interference pattern as generated with respect to the arrangement of FIG. 12 using a storage camera and a video disc. That is, the electrical waveform for $I_1$ may be generated with the arm of phase splitter in FIG. 11 in the positive position and record on video disc rather than transmit directly to the cathode ray tube 120. The arm of the phase splitter may then be moved to its negative position and $I_2$ generated, as previously described, and also recorded on video disc. The output of the two recorded waveforms $(I_1 - I_2)$ may be fed into a multiplier which multiplies by the operator cos $\omega t$ and the waveform so generated applied to a cathode ray tube. The image which results on the face of the cathode tube is recorded on a film plate. The $I_2$ and $I_3$ waveforms may be generated precisely as described above and recorded on video disc. The output of the two waveforms $-(I_2 - I_3)$ are then applied to the multiplier which operates on them by the multiplier sin $\omega t$, thus generating the $-(I_2 - I_3)$ sin $\omega t$ term which again is recorded on the film plate. The resultant recorded interference pattern constitutes a recording which produces a reconstruction identical to that shown in FIG. 7.

The electrical waveform described by the second of the two equations above is generated as the sum of three recording intensities with relative reference phases of zero, $\pi/2$ rad, and $\pi$ rad and multiplying signals by cos $\omega t$, $-(\cos\omega t + \sin\omega t)$ and sin $\omega t$. In order better to understand the operation, consider first the equations. Substituting for $I_1$, $I_2$, and $I_3$ and using the assumed phase shifts in the above equation $$f_1(t) = G^* F(1-j)e^{-j\omega t} + F^* G(1+j)e^{j\omega t}$$

when this waveform is applied to a storage camera, the output intensity $I_0(x, y)$ is given by $$I_0(x,y) = G^*F(1-j)e_r^{-j\omega x} + F^*G(1+j)e_r^{j\omega x}$$

The conjugate cross-correlation terms are thus separated as long as $\omega/2\pi v$ is greater than or equal to the highest image spatial frequency. The resultant reconstruction will be identical to that shown in FIG. 1. As in that system, the camera spatial frequency requirements are the same as that of conjugate cross-correlation terms but the reproducer must have twice the spatial bandwidth in the horizontal or $x$ dimension.

A practical way to generate the waveforms and intensity patterns described in the equations immediately above is illustrated in FIG. 12. Since most of the elements of FIGS. 11 and 12 are the same, corresponding elements are given the same reference numerals in both figures for simplicity. The difference between the two figures is that in FIG. 12 a multiplier 124 is substituted in the circuit between storage tube 108 and cathode ray tube for the phase splitter 112 and the first beam phase shifter 110 is, as illustrated, provided with taps or terminals 126, 128, and 130 for the zero, or reference position, $\pi/2$ radians phase shift (from zero), and $\pi$ radians phase shift respectively. Multiplier 124 also is shown with three taps 132, 134, and 136 which respectively provide multipliers of cos $\omega t$, $-(\cos\omega t + \sin\omega t)$ and sin $\omega t$.

The desired electrical waveform is generated by first placing the contact arm on the phase shifter at zero or reference position (tap 126) and the contact arm of the multiplier at the tap 132 which provides a multiplier cos $\omega t$. The significance of placing the phase shifter arm at zero is simply that we may start with any phase shift in the path of the first beam. The storage camera 108 generates the electrical waveform corresponding to an intensity pattern $I_1$. This waveform is applied to the multiplier 124. Since multiplier 124 has an input which is a function of cos ωt, $I_1$ is multiplied by cos $\omega t$ and generates the waveform $I_1$ cos $\omega t$ that is displayed on the face of the cathode ray tube 120 and stored by some means as on the film plate 122.

Next, the contact arm of the phase shift 110 is moved to the position labeled $\pi/2$ (tap 128). Thus the voltage across the phase shifter 110 is changed so that the first beam is shifted in phase by 90° from the position when the first intensity pattern $I_1$ was generated. The contact arm of the frequency multiplier may be ganged with that of the phase shifter or it simply may be moved to the terminal 134 marked $-(\cos\omega t + \sin\omega t) = -\sqrt{2}\cos(\omega t - 45°)$. Thus, a waveform representing the intensity pattern $I_2$ is generated and multiplied by $-(\cos\omega t + \sin\omega t)$ and stored on the film plate 122 giving the first two full terms of the desired equation.

Next, the contact arms for the phase shifter 110 and multiplier 124 are moved to the upper positions marked $\pi$ and sin $\omega t$, respectively, and the term $I_3$ sin $\omega t$ is generated and recorded on the film plate 122. Thus, using this scanning technique and forming the sum of three recording intensities with relative phases of zero, $\pi/2$ and $\pi$ radians and the appropriate multiplying signals, a recording is formed wherein the conjugate cross-correlation terms are separated and reconstruction of the cross-correlation can be accomplished as described relative to FIG. 7.

The system just described may be used in a motion situation, for example, to provide a real-time visual display. This may be accomplished by combining three successive frames which are each shifted by $\pi/2$ radians to form the desired separate cross-correlations for each group of three, and apply them to a film. This would then require three input frames for one output frame and reduce the allowable motion that should take place during the three frames.

An alternate arrangement is to take advantage of the low acuity of human vision to objects in motion. Here the final three frames are always used to make the output frame, so that each new frame becomes the third of a sequence. Thus one frame is formed from $I_1$, $I_2$, $I_3$, while the nest is formed from $I_2$, $I_3$, and $I_4$ appropriately offset. The input frame rate is thus the same as that of the output. One way to accomplish this is to record successive channels progressively. During relatively rapid motion of the object, the three input frames will differ so that complete cancellation of undesired terms will be disturbed. However, during motion human vision tends to be less aware of these disturbances. Thus, this system presents an effective means of obtaining live real-time comparison of the content of two transparencies.

Most systems previously described discuss having the processed output applied to photographic film. All of the systems described may be used so that the processed generated signals create a continuously addressable variable transparency which, when viewed in coherent light, provides a real-time reconstruction that displays motion.

A number of existing materials have the desirable property of exhibiting control of their light transmission. One such class of materials is known as photochromics. This material has the desirable property that its transmission varies inversely as the applied intensity. Photochromic materials exhibit wave-length selection which allows addressing of the controlled transparency with a wave length that varies its transmission and viewing it with a light source which doesn't appreciably affect its transmission. For example, cathode ray tubes with ultraviolet phosphors can be used to address the photochromic materials with the processed waveforms which are simultaneously viewed in helium neon laser light which doesn't change the transmission of the materials. A similar class of materials are the saturable dyes used in pulsed lasers, such as the phylocyanides.

Another general class of materials that can be electrically addressed includes the electro-optical materials such as ADP, KDP, etc., which can provide either variable-phase or variable-density displays by applying an addressed electrical field across the crystal. (ADP, ammonium dihydrogen phosphate; KDP, potassium dihydrogen phosphate; KTN, potassium trihydrogen nitrate). These materials have successfully been placed inside cathode ray tubes or within a vacuum and scanned with modulated electron beams to create an addressed field across them. The field at each point determines the difference in index of refraction for the vertically and horizontally polarized waves. Linear polarizers and analyzers convert this difference into controlled transmission. Thus the processed signals are used to modulate the scan beam which, in turn, controls the transmission of the material to a coherent light source to reconstruct the correlation spectrum. Another electron beam addressed device is the Eidophor, which provides thickness or phase variations on an oil film that can be used for real-time data processing.

The relative utility of temporal modulation systems as applied to data processing becomes most evident when considering a simultaneous correlation of an unknown two-dimensional function with many known functions as is required in pattern recognition and classification problems. A particular example is character recognition where an unknown character $g$ is cross-correlated with an array of characters $f_1 \ldots fn$ representing all of the letters and numbers. Where temporal modulation is not used, a very large increase in spatial bandwidth of the recorder is required. Because of the large spatial extent of the $f_i$ functions, the function $g$ must have increased spatial separation from them. This is required so that the lowest spatial frequency due to the cross-correlation terms between $g$ and any $f_i$ will be greater than the highest spatial frequency due to $f_1$ and $f_n$, the functions with the greatest separation. The resultant spatial spectrum contains an array of undesired cross-correlation spectra for the various $F_i{*}F_j$ terms of the lowest spatial frequencies, along with an array of desired $G{*}F_i$ and $F_i{*}G$ spectra of the highest spatial frequencies. The huge spatial frequency requirements are far beyond the resolution capabilities of any real-time pickup device. Recognition systems of this type can therefore only operate sequentially where the various $f_i$ functions are serially placed in position with the output information appropriately stored.

Referring now to FIG. 13, there is shown an alternate embodiment of the invention which is capable of a plurality of simultaneous real-time correlations. A beam of coherent light 11 from laser 10 is divided by beam-splitters 29 and 31 into a first beam 33 and additional beams 35 and 37. The first beam 33 is incident upon a first transparency 121 which scatters the light to form a scattered first beam 41 which is transmitted through beam splitters 43, 45, 47, 49, and lens 51 to the plane of an interference pattern 22. The beam 35 is reflected by mirror 53 disposed at 45° to the axis of the beam to a beam-splitter 55. The beam-splitter 55 transmits approximately half of beam 35 and reflects half to form a beam 57. A light frequency shifter 59 is inserted in the path of the beam 57 in order to provide a cyclical temporal offset between beam 57 and the first beam 33. In this case, the frequency shifter 59 constitutes a single sideband modulator which shifts the frequency of beam 57 by an amount $\omega_1$. Operation of the frequency shifter 59 is the same as discussed before in connection with FIG. 1. The light from wave 57 thus modulated is incident on transparency 61 which scatters the light to form a scattered beam 63. Beam splitter 45 reflects the scattered beam 63 through beam splitters 47 and 49 and lens 51 onto the interference plane 22 of image dissector 32. In a similar manner, a light frequency shifter 65 is inserted in the path of the beam 35 in order to provide another cyclical temporal offset between beam 35 and the first beam 33. The frequency shifter 65 is also a single sideband modulator. However, frequency shifter 65 shifts the frequency of beam 35 by an amount $\omega_2$. The light from wave 35 thus modulated is incident on a transparency 67 which scatters the light to form a scattered beam 69. Beam splitter 71 reflects the scattered beam 69 to beam splitter 49 which, in turn, reflects the scattered beam 69 through lens 51 onto interference plane 22 of image dissector 32.

In a corresponding fashion, coherent light from laser 10 (such as beam 11) is reflected by a suitable combination of mirrors (not shown) to another light frequency shifter 73. Frequency shifter 73 is also a single sideband modulator which shifts the frequency of a beam 11 by an amount $\omega_3$. The light from wave 11, thus modulated, is incident on a transparency 75 which scatters the light to form a scattered beam 77. The scattered beam 77 is transmitted through beam splitters 71 and 79 to beam splitter 49 which reflects it through lens 51 to the interference plane 22 on image dissector 32. Similarly, light beam 11 from laser 10 is reflected by a suitable combination of mirrors (not shown) to a light frequency shifter 81. The light frequency shifter 81 is also a single sideband modulator which shifts the frequency of the beam 11 by an amount $\omega_4$. The light from wave 11 thus modulated is incident on a transparency 83 which scatters the light to form a scattered beam 85. Beam splitter 79 reflects the scattered beam 85 to beam splitter 49 which, in turn, reflects the scattered beam 85 through lens 51 onto the interference plane 22 of image dissector 32.

Beam 37 is utilized in a fashion similar to beam 35 to provide a plurality of scattered beams. More specifically, beam 37 is reflected by a mirror 87 to a beam splitter 89. The beam splitter 89 reflects a portion of beam 37 to form beam 91 incident on a light frequency shifter 93. The light frequency 93 is also a single sideband modulator which shifts the frequency of beam 91 by an amount $\omega_5$. The light from beam 91 thus modulated is incident on the transparency 95 which scatters the light to form a scattered beam 97. Beam splitter 43 reflects the scattered beam 97 through beam splitters 47 and 49 and lens 51 onto the interference plane 22.

The light beam 37 transmitted by beam splitter 89 is incident on a light frequency shifter 99. The light frequency shifter 99 is a single sideband modulator which shifts the frequency of beam 37 an amount $\omega_6$. The light from beam 37 thus modulated is incident on a transparency 101 which scatters the light to form a scattered beam 103. Beam splitter 105 reflects the scattered beam 103 to beam splitter 47 which, in turn, reflects the scattered beam 103 through lens 51 onto the interference plane 22.

A coherent beam of light from laser 10 (such as beam 11) is also reflected by a suitable arrangement of mirrors (not shown) to a light frequency shifter 107. Light frequency shifter 107 is a single sideband modulator which shifts the frequency of the beam 11 by an amount $\omega_7$. The light from the beam 11 thus modulated is incident on a transparency 109 which scatters the light to form a scattered beam 111. The scattered beam 111 is transmitted through beam splitters 105 and 113 to beam splitter 47 which reflects it through lens 51 onto the interference plane 22. In a similar manner, coherent light from laser 10 (such as beam 11) is also reflected by a suitable combination of mirrors (not shown) to a light frequency shifter 115. Light shifter 115 shifts the frequency of the beam 11 by an amount of $\omega_8$. The beam 11 thus modulated is incident on a transparency 117 which scatters the light to form a scattered beam 119. The scattered beam 119 is reflected by beam splitter 113 to beam splitter 47 which, in turn, reflects the scattered beam 119 through lens 51 onto the interference plane 22.

Thus, the interference pattern between the scattered first beam 41 and each of the modulated, scattered additional beams is incident on an interference plane 22 of image dissector 32. With the optical data processing system shown in FIG. 13, the entire array of functions $f_i$ appear to be occupying the same area a distance $f$ from the lens 51. Thus, no increase in spatial resolution is required beyond that of the single correlation system of FIG. 1. The various correlation spectra can be separated, however, by using appropriate bandpass filters in a manner similar to that discussed with respect to FIG. 1 inasmuch as the additional scattered waves have all been offset to different temporal frequencies. The offset or modulation frequencies must be chosen so that no one of them is equal to the difference between any other two in order to insure that the cross-correlation spectra between each of the additional waves and the first wave will be isolated in temporal frequency from the cross-correlation terms between the various additional waves. One method of accomplishing this is to have each frequency $$f_i = (4_i - 2)\frac{vX}{\lambda f}.$$

In this case the undesired cross-correlation terms between the various additional transparencies will be interleaved in frequency between the desired cross-correlation terms between the additional transparencies and the first transparency. Each bandpass filter centered at frequency $f_i$ should have a bandwidth of $2vX/\Lambda f$ in order to separate the desired terms. Thus the output $f(t)$ of image dissector 32 in FIG. 13 contains all of the information relative to the cross-correlation of each of the additional beams with the first beam, with the spectrum of each of the desired cross-correlation terms being placed on a different temporal frequency carrier. Thus $f(t)$ can be applied to a computer to perform the inverse transform or a plurality of circuits such as shown in FIG. 3 can be utilized to provide a visual output of only the desired terms. In this case, the circuit found in FIG. 3 would be duplicated the same number of times as there are additional transparencies to be correlated. Each of the bandpass filters is centered at frequency $f_1 \ldots f_8$ with a bandwidth of $2vX/\Lambda f$ and the output $f_1(t) \ldots f_8(t)$ contains correlation information with respect to the first transparency and additional transparencies Thus the ability to simultaneously separate and record the spectra of many cross-correlations makes possible a real-time data processing system.

While particular embodiments of the invention have been shown and described, it will of course be understood that the invention is not limited thereto since many modifications in these circuits, optical arrangements, and in the instrumentalities employed may be made. It is contemplated that the appended claims will cover any such modifications as fall within the true spirit and scope of the invention.

What is claimed is:

1. An optical data processing system for comparing the content of a first transparency with a second transparency comprising:

a. means for forming a first light beam for illuminating the first transparency;

b. means for forming a second light beam having substantially the same frequency spectrum as said first light beam for illuminating the second transparency;

c. modulation means for cyclically temporally offsetting the phase relationship between said first and second light beams;

d. means for combining light transmitted by the first and second transparencies in an interference pattern;

e. scanning means for temporally scanning said interference pattern and generating in response thereto a complex electrical signal containing undesired information relative to the interference of each point of the first transparency with each other point of the first transparency and each point of the second transparency with each other point of the second transparency, and containing desired information relative to the interference of each point of the first and second transparencies with all the other points of the first and second transparencies, respectively, and wherein said desired information is on a temporal frequency carrier;

f. electrical circuit means responsive to said complex electrical signal for extracting said desired information; and g. display means responsive to said electrical circuit means for displaying said desired information.

2. An optical data processing system as defined in claim 1 wherein said modulation means comprises a modulator in the path of said second beam for cyclically offsetting the light from said second beam.

3. An optical data processing system as defined in claim 1 wherein said modulation means comprises a modulator in the path of said first beam for cyclically offsetting the light from said first beam.

4. An optical data processing system as defined in claim 1 wherein said complex electrical signal generated by said scanning means contains a midband frequency spectrum including said undesired information, and frequency sidebands separated from said midband frequency spectrum including said desired information.

5. An optical data processing system as defined in claim 4 wherein said electrical circuit means includes filter means for passing only the said sideband frequency spectra containing the desired information.

6. An optical data processing system as defined in claim 5 wherein said display means includes a cathode ray tube.

7. An optical data processing system as defined in claim 6 wherein said display means additionally includes a photosensitive surface for recording a display on said cathode ray tube.

8. An optical data processing system as defined in claim 7 wherein said display means includes a Fourier transform reconstruction apparatus for reconstructing an image from said photosensitive surface.

9. An optical data processing system for comparing the content of a first transparency with a plurality of additional transparencies comprising:

a. means for forming a first light beam for illuminating the first transparency;

b. means for forming a plurality of additional light beams having substantially the same frequency spectrum as said first light beam for illuminating the plurality of additional transparencies;

c. a plurality of modulation means, one for each additional transparency, for cyclically temporally offsetting the phase relationship between said first light beam and each of said additional light beams;

d. means for combining light transmitted by the first transparency and the plurality of additional transparencies in an interference pattern;

e. scanning means for temporally scanning said interference pattern and generating in response thereto a complex electrical signal containing undesired information relative to the interference of each point of the first transparency with each other point of the first transparency and each point of each second transparency with the other points of the same second transparency and all the points of the other additional transparencies, and containing desired information relative to the interference of each point of the first transparency with each point of the plurality of additional transparencies, and wherein said desired information is on temporal frequency carriers;

f. electrical circuit means responsive to said complex electrical signal for extracting said desired information; and g. display means responsive to said electrical circuit means for displaying said desired information.

10. An optical data processing system as defined in claim 9 wherein said plurality of modulation means comprises a modulator in the path of each of said additional beams for cyclically offsetting the light from each of said additional beams and wherein each of said modulators operates at a temporal frequency different from all other of the said modulators.

11. An optical data processing system as defined in claim 10 wherein said complex electrical signal generated by said scanning means contains a plurality of midband frequency spectra including said undesired information, each midband frequency spectrum having frequency sidebands including said desired information.

12. An optical data processing system as defined in claim 11 wherein said electrical circuit means includes a plurality of filter means, one for each of said midband frequency spectra, for passing only the said sideband frequency spectra containing the desired information.

* * * * *